(12) United States Patent
Haraldsson et al.

(10) Patent No.: US 6,558,608 B2
(45) Date of Patent: May 6, 2003

(54) METHOD FOR MOLDING FIBER REINFORCED COMPOSITE CONTAINER

(75) Inventors: Rikard Karl Haraldsson, Elkton, MD (US); Andrew Paul Perrella, Hockessin, DE (US)

(73) Assignee: TPI Technology, Inc., Warren, RI (US)

( * ) Notice: Subject to any disclaimer, the term of this patent is extended or adjusted under 35 U.S.C. 154(b) by 0 days.

(21) Appl. No.: 09/928,774

(22) Filed: Aug. 13, 2001

(65) Prior Publication Data

US 2002/0028310 A1 Mar. 7, 2002

Related U.S. Application Data

(63) Continuation of application No. 08/872,282, filed on Jun. 10, 1997, now abandoned, which is a continuation-in-part of application No. 08/672,175, filed on Jun. 27, 1996, now abandoned, which is a continuation-in-part of application No. 08/609,671, filed on Mar. 1, 1996, now abandoned.
(60) Provisional application No. 60/000,584, filed on Jun. 28, 1995.

(51) Int. Cl.[7] .............................................. B29C 70/36
(52) U.S. Cl. ...................... 264/516; 264/102; 264/154; 264/257; 264/258; 264/263; 264/266
(58) Field of Search ................................ 264/510, 511, 264/516, 256, 257, 258, 263, 102, 266, 264

(56) References Cited

U.S. PATENT DOCUMENTS

| | | | | | |
|---|---|---|---|---|---|
| 4,239,008 A | * | 12/1980 | Conlon | ........................ | 105/377 |
| 4,267,142 A | * | 5/1981 | Lankheet | ..................... | 264/510 |
| 5,000,903 A | * | 3/1991 | Matzinger et al. | ........... | 264/511 |
| 5,152,860 A | * | 10/1992 | Grossman et al. | ........... | 156/173 |
| 5,266,249 A | * | 11/1993 | Grimes, III et al. | ........ | 264/42.5 |
| 5,717,160 A | * | 2/1998 | Bootle | ........................ | 174/35 R |
| 5,721,034 A | * | 2/1998 | Seemann, III et al. | ......... | 428/71 |
| 5,855,174 A | * | 1/1999 | Thoman et al. | .............. | 105/413 |
| 5,857,414 A | * | 1/1999 | Thoman et al. | .............. | 105/397 |

FOREIGN PATENT DOCUMENTS

JP         7-80948      * 3/1995

* cited by examiner

Primary Examiner—Stefan Staicovici
(74) Attorney, Agent, or Firm—Daniel C. Abeles; Eckert Seamans Cherin & Mellott, LLC (57) ABSTRACT

A method of constructing large, unitary, fiber-reinforced Polymer composite containers using a vacuum assisted resin transfer molding process. The method allows for the construction of container systems with only two separately molded parts—an open box consisting of a base (i.e., floor), 2 sidewalls and 2 endwalls, and a cover (i.e., roof). The method results in a structure which maintains the continuity of the reinforcement fibers across the junction between the floor, side, and end walls corners. This method can be applied to very large composite structures such as railcar bodies, intermodal containers, and shelters.

14 Claims, 8 Drawing Sheets

METHOD FOR MOLDING FIBER REINFORCED COMPOSITE CONTAINER

CROSS-REFERENCE TO RELATED APPLICATION

This application is a continuation of application Ser. No. 08/872,282 filed Jun. 10, 1997, now abandoned which is a continuation-in-part of application Ser. No. 08/672,175 filed Jun. 27, 1996, now abandoned, which is a continuation-in-part of application Ser. No. 08/609,671 filed Mar. 1, 1996 now abandoned, which in turn claims the benefit of U.S. Provisional Application No. 60/000584 filed Jun. 28, 1995.

BACKGROUND OF THE INVENTION

This invention relates to a method of constructing unitary fiber reinforced resin composite containers using a vacuum assisted resin transfer molding process.

Fiber reinforced composite containers such as railcar bodies, intermodal containers, and truck bodies which incorporate materials such as foam and balsa cores are desirable because they are lightweight, corrosion resistance, and provide excellent thermal insulation. To make these containers competitive with metal structures, the manufacturing costs must be minimized without sacrificing structural performance. Typically, high stress levels are generated in the corners of these containers due to large bending moments. For applications such as railcar bodies, high compressive stresses in the floor are experienced due to fork lift truck wheel loading.

Composite containers can be produced in several ways. One method consists of assembling a series of flat panels (e.g., pultrusions) using a secondary adhesive bonding approach. This manufacturing approach results in joints at the corners of the structure and a discontinuity of fiber reinforcement. This invention eliminates fiber discontinuities at the corners and adhesive bonding of multiple panel sections.

Typically, composite parts and structures which are exposed to the environment need to be protected from UV degradation and weathering, as well as being made aesthetically pleasing. The effects of UV and weathering are currently reduced or eliminated by: incorporating UV absorbers into the resin; incorporating fillers into the resin; pigmenting the outer resin layers of the composite part; gel coating the surface prior to molding; and/or painting the finished surface. Of these methods, gel coats (which are applied prior to the composite fabrication process), and paint (which is applied as a secondary operation after the composite fabrication process) are the most effective. However, the application of gel coats or paints results in the emission of VOCs. Both gel coating and painting operations also require a large capital expenditure both in spraying and ventilation systems and equipment. Gel coated parts must be layed up and molded within a reasonable time after the gel coat is applied, in order to obtain a good bond between the gel coat and the part being molded. However, large, structural parts may take several days to lay up, many more during the prototyping stages. Automation and process improvements will speed up the lay-up time, but this time will probably still be too long for a gel coating operation. Aesthetically pleasing surfaces are usually accomplished by either gel coating or painting.

SUMMARY OF THE INVENTION

This invention defines an approach for constructing large composite containers using a vacuum assisted resin transfer molding process. The method is applied to large composite containers such as rail car bodies which may be as large as 68 feet long by 10 feet wide by 12 feet high. The approach consists of molding only two (2) individual parts which are subsequently joined. An open box with 2 or 4 sides and a floor is fabricated in one molding step with the top or roof molded in a separate operation.

The materials (e.g., fabric and cores) are initially positioned on three (3) or five (5) separate molds which are supported by casters and oriented horizontally. After the individual sections are laid-up, the two (2) sidewalls and optionally two (2) endwalls are attached to the base floor mold. The sidewalls and endwall molds are then rotated into a vertical position and bolted together. The hinging mechanism allows for the mold segments to be attached to the base mold and rotated freely into a vertical position. The hinge also provides for a secondary lateral movement to seat the sidewall molds to the base mold.

The sidewall and endwall molds are designed so that a small portion of the floor is included. This allows the entire corner geometry to be incorporated and creates a vertical joint with the floor mold. This section of the mold also provides a lip which effectively contains the lay-up during mold rotation. At the interfaces between molds, a seal is provided to maintain the vacuum integrity of the assembled mold because if air leaks along the mold, surface finish defects and possibly structurally weakened areas (depending on the intensity and location of the leak) will occur. Indexing keyways are also provided to ensure alignment between sections.

This invention relates to the material lay-up method used to maintain the fiber continuity across the corners of the composite container. Although the five sections are laid up separately, fiber continuity is maintained by the inclusion of additional material in each lay-up beyond the size of the section. This added material is initially folded back on itself and then unfolded after the molds are assembled. The layers of unfolded fabric extend the required distance and are interleaved (overlapped) with fabric in the adjacent section to effectively transfer the load around the corner.

Metal caul plates may be positioned over the inside of the lay-up to improve surface definition and smoothness. These caul plates are held in place by retainers at the top of each section to prevent movement during the rotation of the molds.

After the molds are assembled and the fabric is unfolded in each corner, the entire lay-up is vacuum bagged. A pre-seamed vacuum bag is used which replicates the inside of the box. A continuous seal is created at the top edge of the sidewalls and endwalls. A resin matrix is then infused into the box using a vacuum assisted resin transfer molding process. Once the resin has cured the box is now a unitary structure.

The sidewalls can have openings within the sidewalls of the size and shape suitable for accommodating structural elements, such as doors and windows, or suitable for the installation of miscellaneous systems and/or equipment, such as mechanical refrigeration units. The composite box can comprise means for supporting ancillary structures appendable to the composite box, such as metal attached plates, mounting studs/threaded attachments, bearing plates, brackets, beams, fittings, hinges, lateral beams, transverse beams, floor stringers, corner rails, and/or posts. The composite box can further integrate internal co-molded hollow elements integrated within the walls of the composite box suitable for running utilities, such as co-molded ducting and/or conduits for air flow, water, and miscellaneous systems, such as electrical wiring.

The method of forming a composite box having end, side, and bottom walls comprises forming a plurality of cores, each having a peripheral surface, length and width dimensions extending end-to-end and side-to-side, respectively, positioning said cores end-to-end and side-by-side in respective mold segments that define said end, side, and bottom walls while encapsulating the cores in fabric material; assembling the mold segments to interface with one another to form a box, said fabric material overlapping with fabric material in adjacent mold segments; sealing the interface between the mold segments enclosing said molds in a hermetically sealed bag having inlets and outlets; connecting a source of uncured resin to said inlets evacuating said molds through said outlets; forcing said uncured resin through said inlets to said outlets to fill the mold between said core and said mold to impregnate said fiber material; curing said resin to form a Composite box; and removing the mold segments. Preferably, the resin is vinyl ester or polyester.

In forming the composite box of the present invention, openings can be included within the walls of the composite box of a size and shape suitable for accommodating structural elements. The cores can be positioned in order to create an opening within the sidewalls suitable for accommodating structural elements. Means for supporting ancillary structures to the walls within the composite box can be appended to the walls of the composite box. Hollow elements having endings at the surface of the walls of the composite box can be co-molded within the composite box, and the endings of the hollow elements can be filled with an easily-removable substance, such as clay, preventing the hollow openings from filling with resin during the process of filling the molds.

The composite box structure comprises end, side, and bottom walls, each of said walls, including a plurality of cores having a peripheral surface, length and width dimensions; the cores are positioned end-to-end and side-by-side to define said end, side, and bottom walls; a layer of fiber material encapsulates the cores and bridges the adjacent edges of said end, side, and bottom walls; and a cured resin material saturates said layer of fiber material to form a unitary composite box structure.

The composite box also includes fiber material caps along the length of said core, side-by-side positioning of said cores, and resin saturated fiber material form I beam reinforcements in said end, side, and bottom walls and said top.

The composite box can be constructed with a co-molded layer molded to the top and side and bottom walls. The co-molded outer surface would protect against UV degradation and weathering, and therefore will have enhanced UV stability and enhanced abrasion, impact, and wear resistance. The co-molded layer can be either a film or sheet of material which will bond chemically and/or mechanically with the resin system used in fusing the composite portion of the box. Co-molded layer could be, inter alia, a sheet made of acrylic or polyvinylidene fluoride. The co-molded surface should, in addition, guard against fiber print-through and offer an aesthetically pleasing surface with multiple color options, which should not fade over the expected product life.

A railroad car may be built comprising a box, as defined above, mounted to a wheeled frame structure reinforced with steel I beams that interact with the I beam reinforcements in said bottom wall. The composite box can also be used for cargo and shipping containers, truck trailer bodies, modular housing, and insulated refrigeration rail cars.

DETAILED DESCRIPTION OF THE PREFERRED EMBODIMENT

Figure 1:
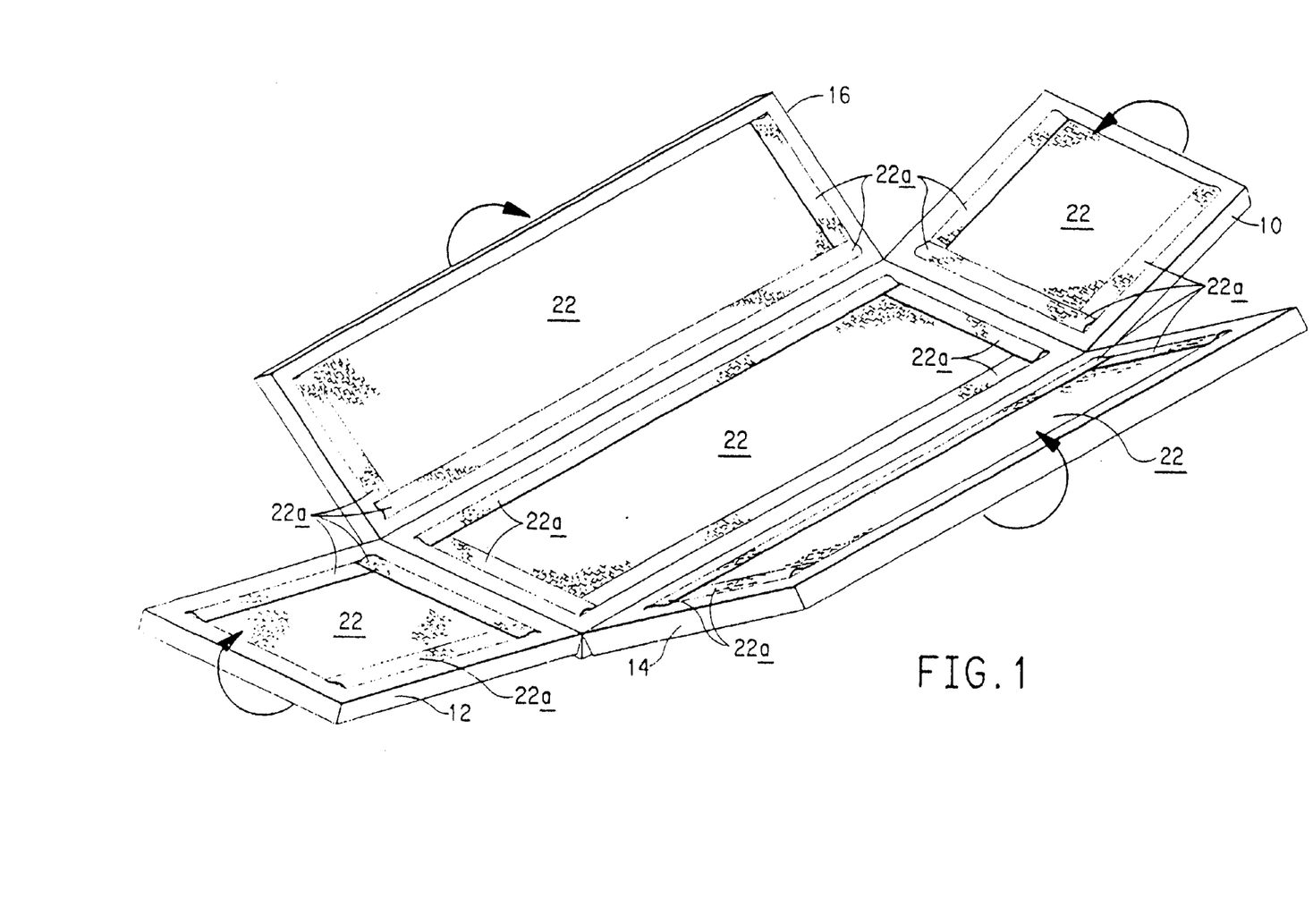
FIG. 1 shows five separate molds containing materials positioned for forming a box.
Figure 2:
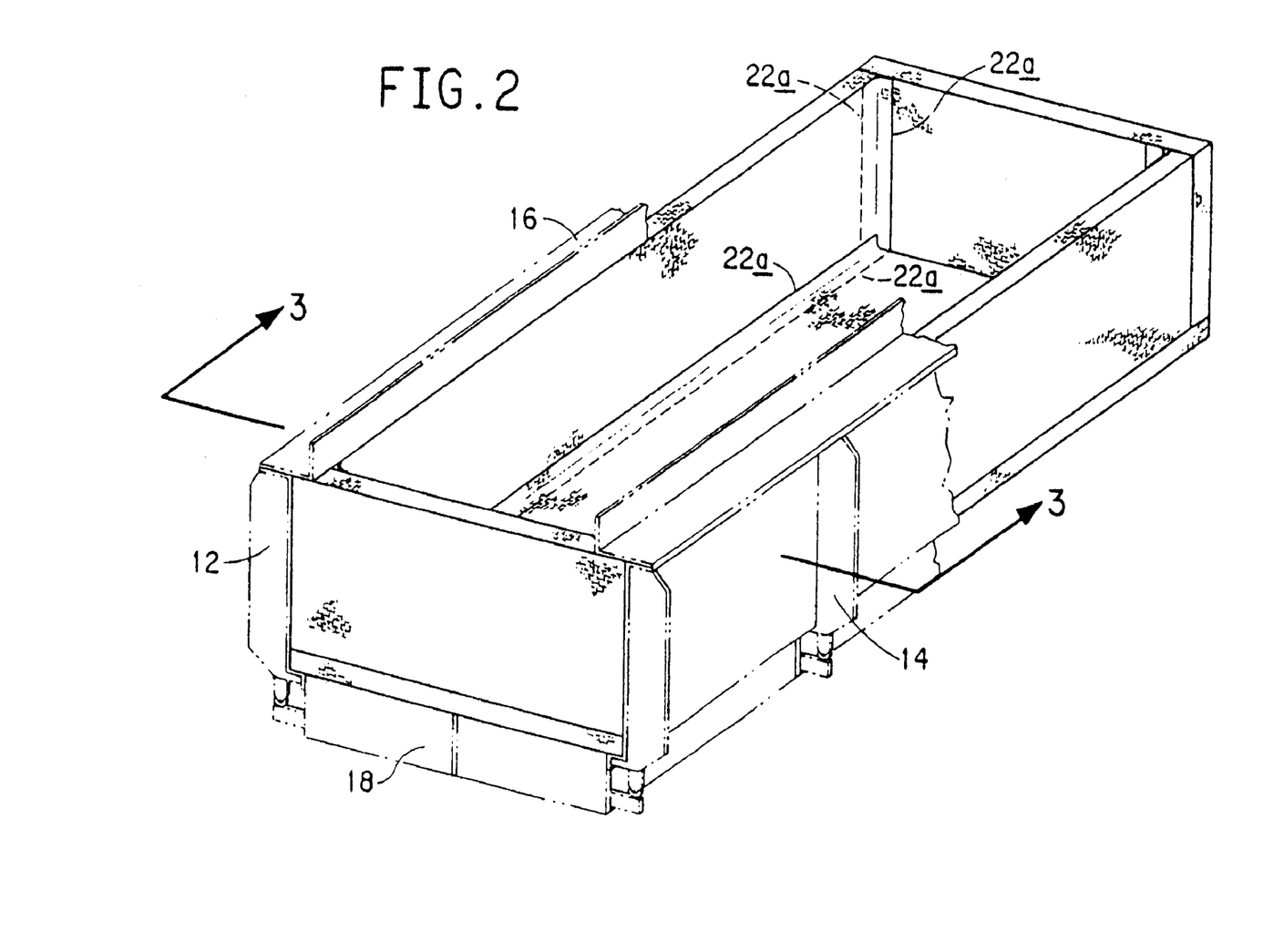
FIG. 2 shows the five separate molds of FIG. 1 in the shape of a box.
Figure 3:
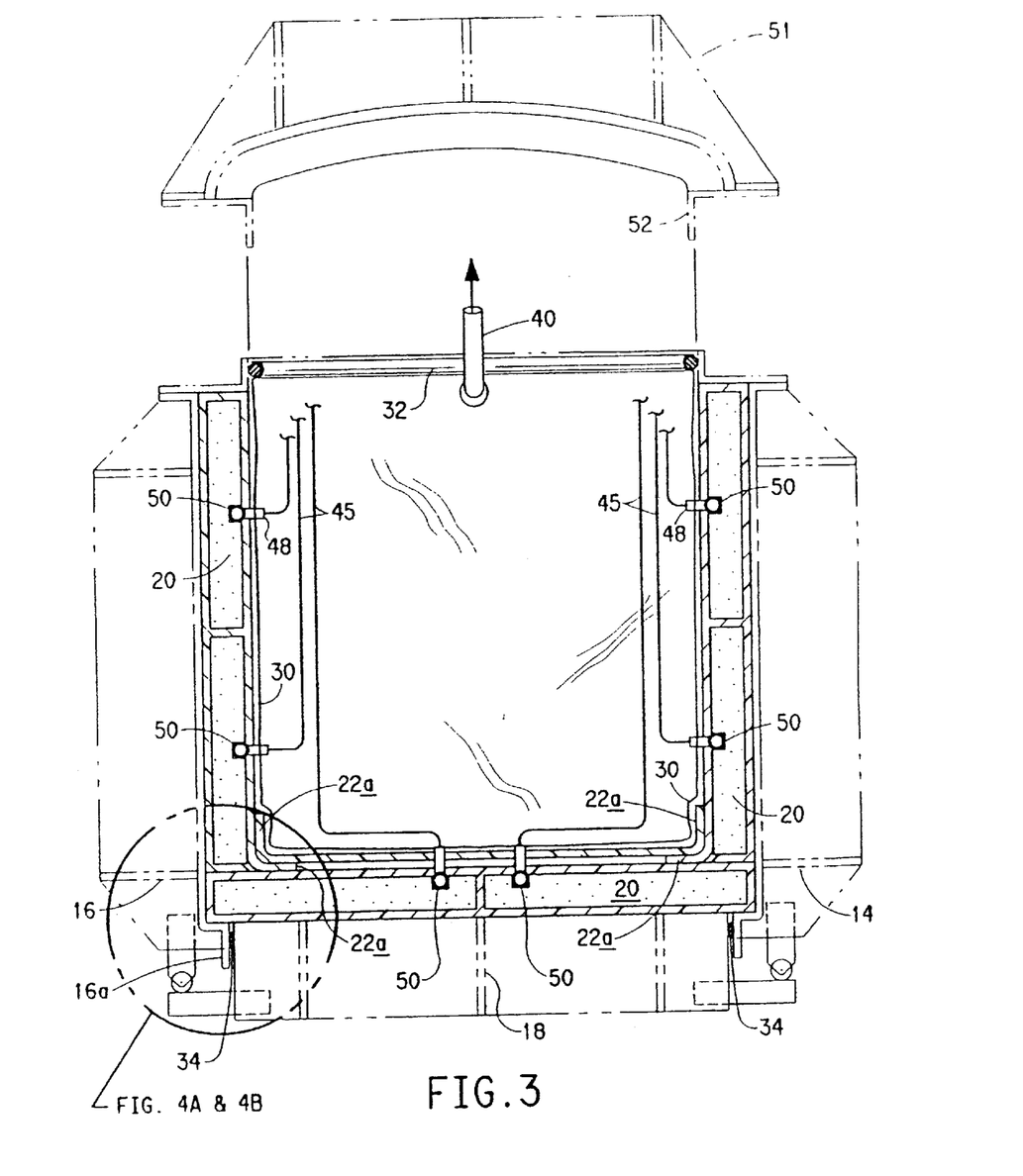
FIG. 3 is a cross-sectioned view of FIG. 2 taken along line 3—3 with the addition of vacuum bagging and its relationship to a roof section.

Referring to FIGS. 1, 2, 3 and 8, five separate molds are shown to include two end walls 10, 12, two side walls 14, 16 and a floor 18. These molds contain cores covered with fabric as best shown on FIG. 3. For example, cores 20 are placed in a mold, with fabric 22 covering the cores. Since a key to this invention is to maintain the continuity across the junction between the floor side and end wall corners of the box, additional material 22a is included in each lay up which is beyond the size of the mold. This material is initially folded back on itself and then unfolded after the molds are assembled and interleaved with material in adjacent molds to transfer load around corners (FIGS. 1, 2, and 3).

Figures 4, 5:
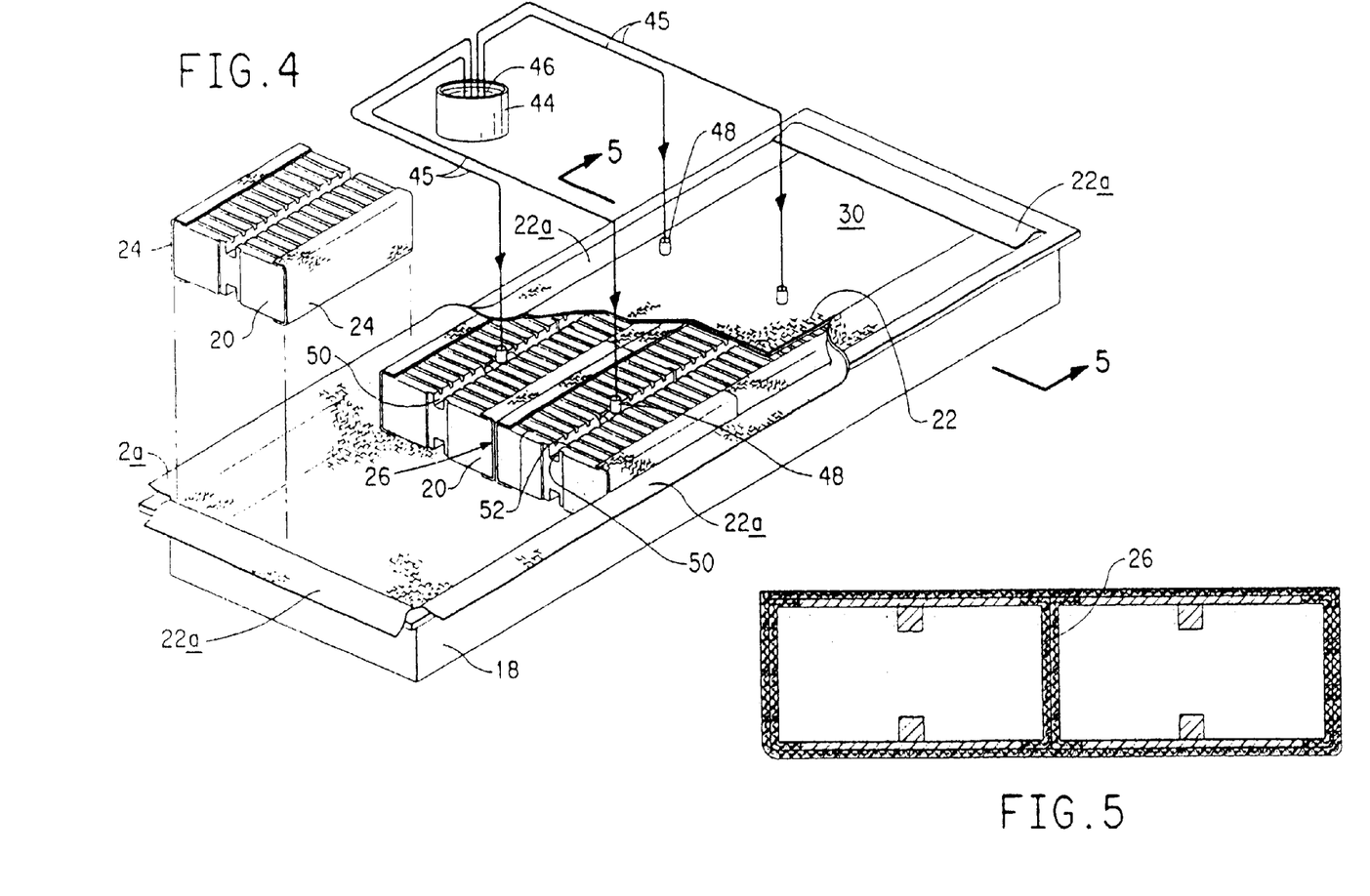
FIG. 4 is a cut away view of a mold.
FIG. 5 shows a cross section of a mold.

FIG. 4 is a cut away view of the floor mold 18 showing the cores 20 assembled within the mold. The cores can be of various materials suitable for the particular use being made of the composite box. A preferred material for the cores is foam which has the added feature of providing insulation where the box is used as a refrigerated rail car.

After the molds are assembled and sealed at their interfaces, the entire box is vacuum bagged. A pre-seamed vacuum bag 30 is used, and a continuous seal 32 is created at the top edges of the end wall and side walls. At the interface between mold sections a chemical barrier seal 34 is provided (FIGS. 3 and 4A) to provide vacuum integrity of the assembled mold sections.

Referring now to FIGS. 3 and 4, a vacuum outlet 40 is connected to a vacuum source (not shown) and to the interior of the bag 30. A source 44 of uncured resin 46, such as tank 44 containing vinyl ester or polyester, is connected through bag 30 via tubing 45 and T shaped fittings 48 placed in channels 50 of core 20. Channels 50 are connected to a distribution network either in or on the surface of core 20.

In operation, the bag 30 is evacuated forcing uncured resin 46 through channels 50 and grooves 52 to fill the mold and the bag 30 to impregnate fiber material 22, 22a and 24. The resin is allowed to cure.

After removing the vacuum bagging materials and the connections between mold segments, the side and endwall molds are removed. After the molds are separated, they are rotated back to their horizontal position (the molded walls remain) vertical). The box is removed from the base mold.

A roof structure 51 is molded separately in one piece using the same method as the box. The roof is molded as a 'tub' which incorporates a small portion of both the side and end walls. This allows for the molding of the entire corner of the roof and creates a single horizontal seam between the box and roof. The roof may include a vertical flange 52 which fits inside the interior surface of the box sidewalls. This flange helps align the roof to the box during assembly and allows for the installation of a mechanical fastener into the sidewall.

Figure 4A:
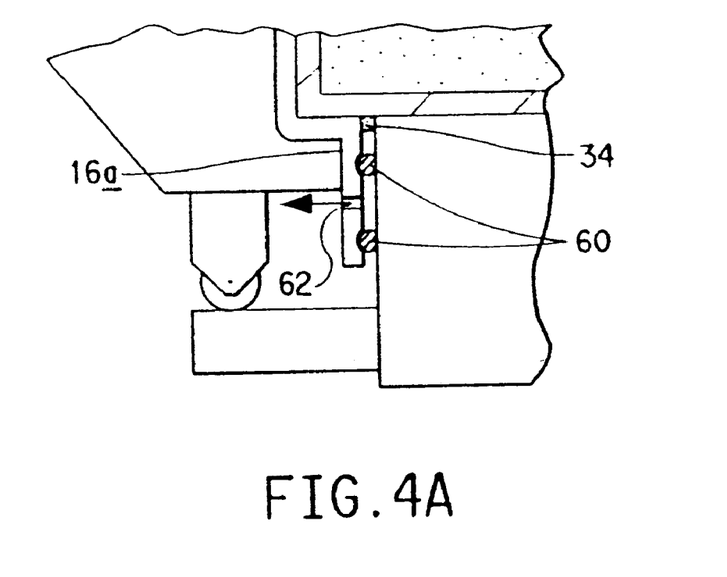
FIGS. 4a and 4b are enlarged partial views of FIG. 3 showing alternate embodiments of the improved seal of this invention.
Figure 4B:
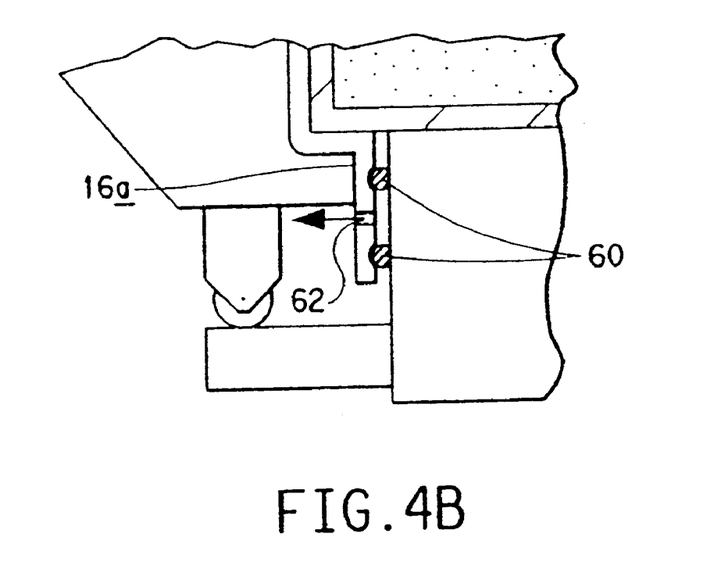

As best shown in FIGS. 4A and 4B, a typical mold section joint consists of a flange 16A that is normal to the mold surface extending along the entire edge. This flange provides a mating surface to which seals, indexing features, and clamping mechanism may be attached. There exists a pressure differential between the mold surface (low pressure) and the back of the mold (high atmospheric pressure). In order to maintain this pressure differential, a "system" of seals (i.e., a chemical barrier seal 34 and a vacuum seal 60 FIG. 4A) are attached to one or both flanges. The main seal or vacuum seal consists of a closed loop gasket which in the cross section shown in FIGS. 4A and 4B is designated 60. A vacuum is applied within this closed loop through vacuum part 62. If the one or both of the active seals should fail, the leak path will follow the path of least resistance and is intercepted by the vacuum source. The main seal 60 needs to be very compliant so that the initial seal can be provided with a relatively light clamping force. Once the vacuum is applied and the "loop" is evacuated through vacuum port 62, the seals will be compressed by the atmospheric pressure that exists on the back side of the flange. This provides an additional benefit of requiring minimal external clamps to hold the mold segments in position as we now have available to us a clamping mechanism that provides a very uniform clamping pressure along the entire length of the flange area. The embodiment shown as FIG. 4B can provide a satisfactory seal without the need for a chemical barrier seal. This force can be considerable and is a product of the area of the closed loop and the atmospheric pressure (app 14.7 PSI). Some of the materials that may be used for the Active Seal include closed cell foam extrusions of Neoprene, EPDM, Silicone, etc.

Figure 8:
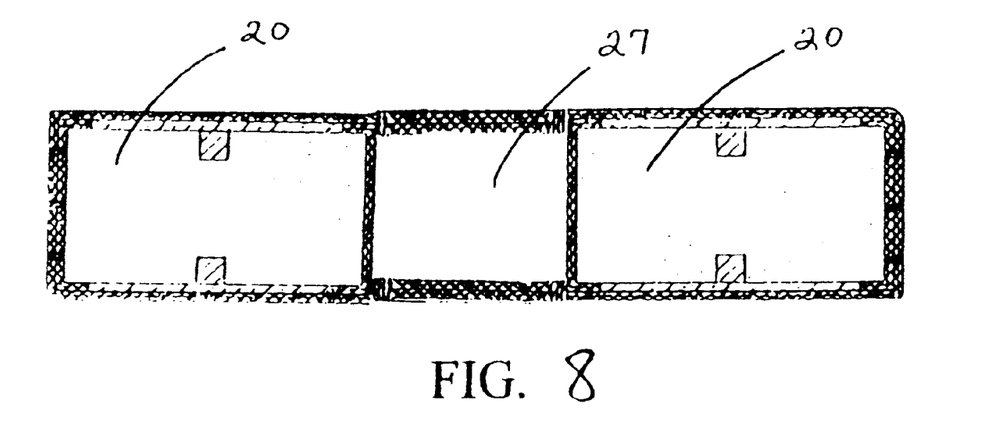
FIG. 8 shows a cross section of a mold having a co-molded hollow element.

The cores are shown in FIG. 4 with C-clamps 24 and 26 around the ends of the cores. FIG. 5 shows a cross section of the cores 20 separated by C-clamps 26 and FIG. 8 shows a cross section of the cores 20 separated by a hollow element 27 co-molded and integrated within the walls of the mold suitable for running utilities within the mold.

Figure 6:
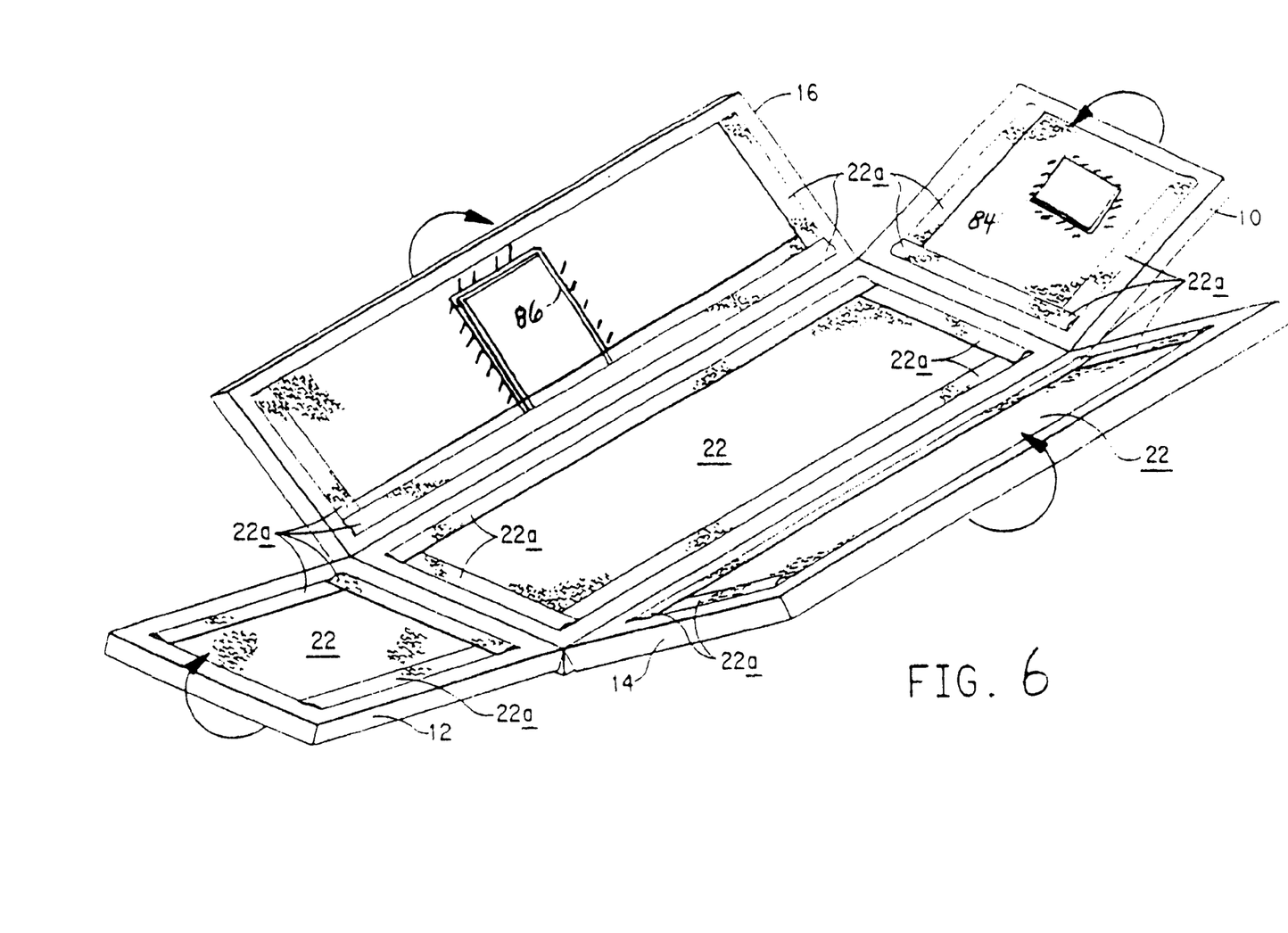
FIG. 6 shows the incorporation of co-molded openings within the walls of the composite box.

Shown in FIG. 6 are two openings co-molded into the walls. The larger opening 86 is suitable for a door or larger system and/or equipment such as a mechanical refrigeration unit, and the smaller opening 84 is suitable for a window or smaller system or equipment.

Figure 7:
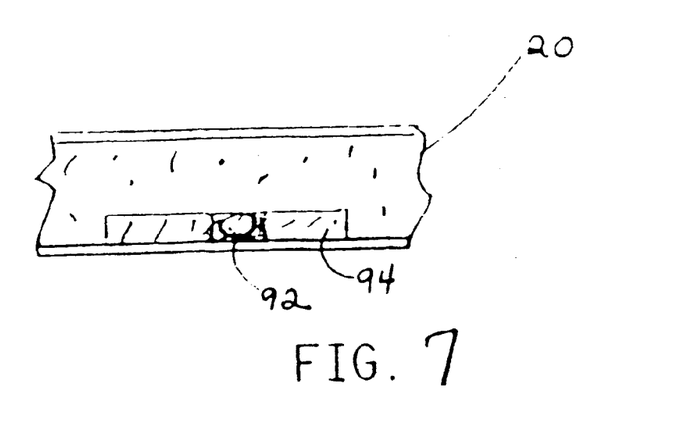
FIG. 7 shows a cross section of the walls of the composite box.

Supporting ancillary structures can be appended to the walls of the composite box such as the metal attach plate 94 shown in FIG. 7. In addition, hollow elements 92, having endings at the surface of the walls of the composite box can be filled with a removable substance (not shown) such as clay to prevent the hollow openings from filling during the process of filling the molds.

Figure 9:
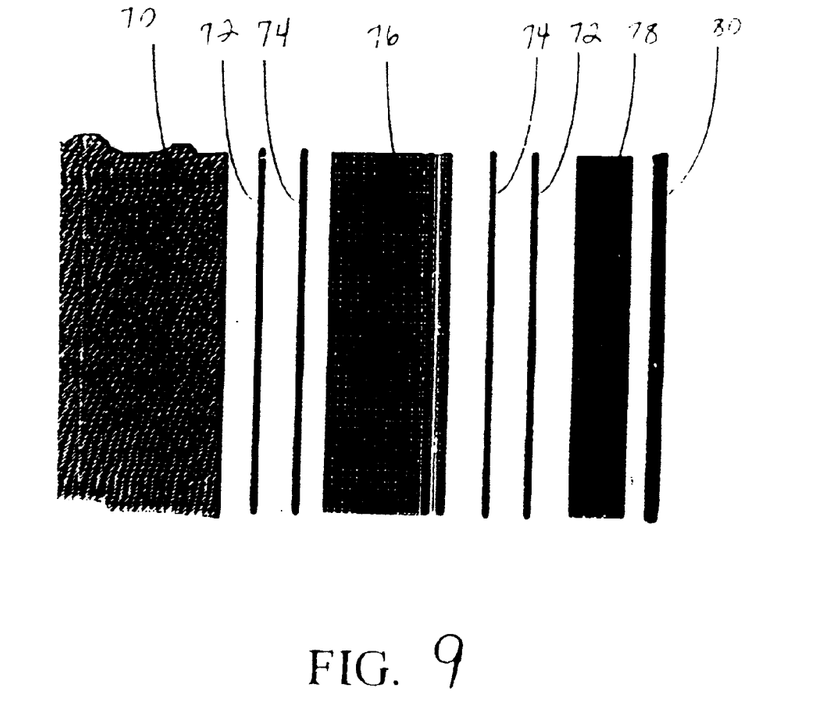
FIG. 9 shows a cross-section of a typical composite lay-up in a mold, including the co-molded film or sheet.

A typical mold lay-up as shown in FIG. 9 consists of a mold 70, a film or sheet of surfacing material 72, the fabric lay-up 74, a core material 76, a caul plate 78, and a vacuum bag 80. The surfacing material 72 is placed in the mold during the composite lay-up and prior to infusion, and is co-molded with the fabric 74 and core 76 into the final composite structure.

Figure 10:
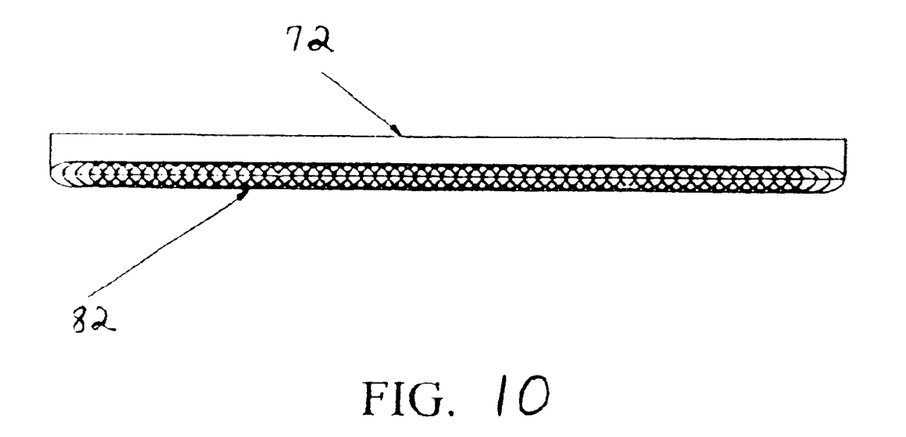
FIG. 10 shows a cross-section of the fabric lay-up co-molded to a plastic sheet.

A thermosetting resin typically bonds to the plastic sheet by chemical means (it attacks the surface of the plastic, thereby forming a good bond when the resin cures). If the bond strength between the plastic sheet and the cured fiberglass/resin laiminate is not satisfactory by this method (chemical bond) alone, a fabric layer can be imbedded into the plastic sheet prior to the molding operation. This gives the resin something to lock into during the molding process, thus forming a mechanical bond as shown in FIG. 10 between the plastic sheet 72 and the cured fiberglass/resin laminate 82 (in addition to any chemical bond which may also exist).

What is claimed is:

1. A method of forming a composite box having end, side and bottom walls said method comprising:

forming a plurality of cores each having a peripheral surface;

positioning said cores in five separate and distinct mold segments that respectively define said end, side, and bottom walls comprising five walls of said box while encapsulating the cores in fabric material;

assembling the mold segments to interface with one another to form said box, said fabric material in each mold segment extending outside said mold segment and overlapping with fabric material in adjacent mold segments in a manner that said overlapping fabric is interleaved to maintain continuity across the junction between said bottom, end and side walls;

sealing the interface between said mold segments;

enclosing said assembled molds in a hermetically sealed bag having an inlet and an outlet;

connecting a source of uncured resin to said inlet; evacuating said mold segments through said outlet;

forcing said uncured resin through said inlet to said outlet to fill said mold segments between said core and said mold segments to impregnate said fiber material;

curing said resin to form said composite box; and removing said mold segments.

2. The method of claim 1, wherein said resin is vinyl ester.

3. The method of claim 1, wherein said resin is polyester.

4. The method of claim 1, wherein sealing the interface between the mold segments is provided by a vacuum wherein a vacuum is drawn through the seal.

5. A method of forming a composite box having end, side and bottom walls, said method comprising:

forming a plurality of cores, each having a peripheral surface;

positioning said cores end-to-end and side-by-side in five separate and distinct mold segments that respectively define said end, side and bottom walls comprising five walls of said box while encapsulating the cores in fabric material that extends outside of each mold segment at an interface with adjacent mold segments;

assembling said mold segments to interface with one another to form said composite box, said fabric material overlapping with fabric material in adjacent mold segments in a manner that said overlapping fabric is interleaved to maintain continuity across the junction between said bottom, end and side walls;

sealing said interface between said mold segments;

enclosing said assembled mold segments in a hermetically sealed bag having at least one inlet and outlet;

connecting a source of uncured resin to said at least one inlet, evacuating said mold segments through said at least one outlet;

forcing said uncured resin through said at least one inlet to said at least one outlet to fill said mold segments between said cores and said mold segments to impregnate said fiber material;

curing said resin to form a composite box; and removing said mold segments.

6. The method of forming the composite box of claim 5 wherein said composite box also includes two end walls each including a plurality of cores having a peripheral surface, length, and width dimension, said cores being positioned end-to-end and side-by-side to define said end walls.

7. The method of forming the composite box of claim 5 wherein said walls have openings within said walls of a size and shape suitable for accommodating a structural element.

8. The method of forming the composite box of claim 5 further comprising co-molding a surface layer to said walls, wherein said co-molded layer absorbs UV radiation and has enhanced abrasion, impact, and wear resistance.

9. The method of forming the composite box of claim 8 wherein said co-molded layer is an acrylic sheet.

10. The method of forming the composite box of claim 8 wherein said co-molded layer is made of polyvinylidene fluoride.

11. The method of forming the composite box of claim 5 further comprising appending means for supporting ancillary structures to said walls within said composite box.

12. The method of forming the composite box of claim 5 wherein said cores are positioned in order to create an opening within said walls suitable to accommodate a structural element.

13. The method of forming the composite box of claim 5 further comprising co-molding hollow elements, within and under the surface of the walls of said composite box, having endings at the surface of said walls and filling the endings of said hollow elements with an easily removable substance, preventing said hollow openings from filling with resin during the process of filling the molds.

14. The method of forming the composite box of claim 13 wherein the easily removable substance is clay.

* * * * *

UNITED STATES PATENT AND TRADEMARK OFFICE
CERTIFICATE OF CORRECTION

PATENT NO. : 6,558,608 B2
DATED : May 6, 2003
INVENTOR(S) : Rikard Karl Haroldsson et al.

It is certified that error appears in the above-identified patent and that said Letters Patent is hereby corrected as shown below:

Column 6,
Line 9, "laiminate" should read -- laminate --.

Signed and Sealed this

Nineteenth Day of August, 2003

JAMES E. ROGAN
*Director of the United States Patent and Trademark Office*